(12) United States Patent
Tian et al.

(10) Patent No.: US 10,127,259 B2
(45) Date of Patent: Nov. 13, 2018

(54) SYSTEM AND METHOD FOR DATABASE PERSISTENCE OF TRANSACTION LOGS

(71) Applicant: Oracle International Corporation, Redwood Shores, CA (US)

(72) Inventors: Weijun Tian, Beijing (CN); Paul Parkinson, Wenonah, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/632,836

(22) Filed: Oct. 1, 2012

(65) Prior Publication Data

US 2013/0085996 A1 Apr. 4, 2013

Related U.S. Application Data

(60) Provisional application No. 61/541,024, filed on Sep. 29, 2011.

(51) Int. Cl.
*G06F 7/00* (2006.01)
*G06F 17/00* (2006.01)
*G06F 17/30* (2006.01)

(52) U.S. Cl.
CPC .. *G06F 17/30368* (2013.01); *G06F 17/30575* (2013.01)

(58) Field of Classification Search
CPC ......... G06F 17/30377; G06F 17/30368; G06F 17/30371; G06F 17/30575; G06F 17/30374; G06F 17/30283; G06F 17/30286; G06F 17/30289; G06F 17/303; G06F 17/30309

USPC ....... 707/682, E17, 999, 999.2, 648; 705/40; 714/15; 709/203
See application file for complete search history.

(56) References Cited

U.S. PATENT DOCUMENTS

| | | | |
|---|---|---|---|
| 5,465,328 A * | 11/1995 | Dievendorff ........ | G06F 11/1471 707/999.202 |
| 6,671,699 B1 * | 12/2003 | Black ......................... | G06F 8/60 |
| 7,917,470 B2 | 3/2011 | Barnes et al. | |
| 2003/0140007 A1 * | 7/2003 | Kramer et al. ................. | 705/40 |
| 2003/0145103 A1 * | 7/2003 | Pruyne ................... | H04L 29/06 709/237 |
| 2004/0098425 A1 * | 5/2004 | Wiss et al. ..................... | 707/204 |
| 2008/0250074 A1 * | 10/2008 | Parkinson ..................... | 707/200 |
| 2008/0250272 A1 * | 10/2008 | Barnes et al. .................. | 714/15 |
| 2010/0169284 A1 * | 7/2010 | Walter et al. ................. | 707/682 |

* cited by examiner

*Primary Examiner* — James Trujillo
*Assistant Examiner* — John J Morris
(74) *Attorney, Agent, or Firm* — Tucker Ellis LLP

(57) ABSTRACT

A system and method for database persistence of transaction logs (TLOGs). Embodiments of the invention allow an administrator to configure their system to associate one or more Java Database Connectivity (JDBC) TLOG stores with a data source or database instead of a file system, for use in storing the primary TLOG. This provides an opportunity to exploit the high availability features of a database system; improve handling of disaster recovery scenarios, such as cross-site recovery using database replication; and alleviate the need for third-party distributed file system components, together with their cost and complexity.

21 Claims, 3 Drawing Sheets

SYSTEM AND METHOD FOR DATABASE PERSISTENCE OF TRANSACTION LOGS

CLAIM OF PRIORITY

This application claims the benefit of priority to U.S. Provisional Patent Application titled "APPLICATION SERVER HAVING A DEVELOPER WEB PROFILE CONSOLE BUILT ON AN EXTENSIBLE DECLARATIVE AND DOMAIN-SPECIFIC PROGRAMMING LANGUAGE"; Application No. 61/541,024; filed Sep. 29, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to systems for processing transactions, and are particularly related to a system and method for database persistence of transaction logs.

BACKGROUND

Systems for processing transactions, such as those that include a WebLogic application server, generally operate according to ACID properties, namely that a transaction should be Atomic—all of the changes that a transaction makes are either made as one unit or are rolled back; Consistent—a transaction transforms data from a previous valid state to a new valid state; Isolated—changes made to a database by a transaction should not be visible to other operations until the transaction has completed; and Durable—changes made by a transaction should survive system failures.

While processing a transaction, a server acting as a transaction manager maintains a transaction log which stores information about the transactions being coordinated by the server that may not have fully completed. In the event of a system failure, the server, or a backup, can use the transaction log to recover in-flight transactions.

To support failover, the transaction log can be stored in a location available both to the transaction manager and its backup, e.g., on a dual-ported SCSI disk, or as a distributed file system. However, such configurations can be costly and complex to administer. This is generally the area embodiments of the invention are intended to address.

SUMMARY

Disclosed herein is a system and method for database persistence of transaction logs (TLOGs). Embodiments of the invention allow an administrator to configure their system to associate one or more Java Database Connectivity (JDBC) TLOG stores with a data source or database instead of a file system, for use in storing the primary TLOG. This provides an opportunity to exploit the high availability features of a database system; improve handling of disaster recovery scenarios, such as cross-site recovery using database replication; and alleviate the need for third-party distributed file system components, together with their cost and complexity.

DETAILED DESCRIPTION

Figure 1:
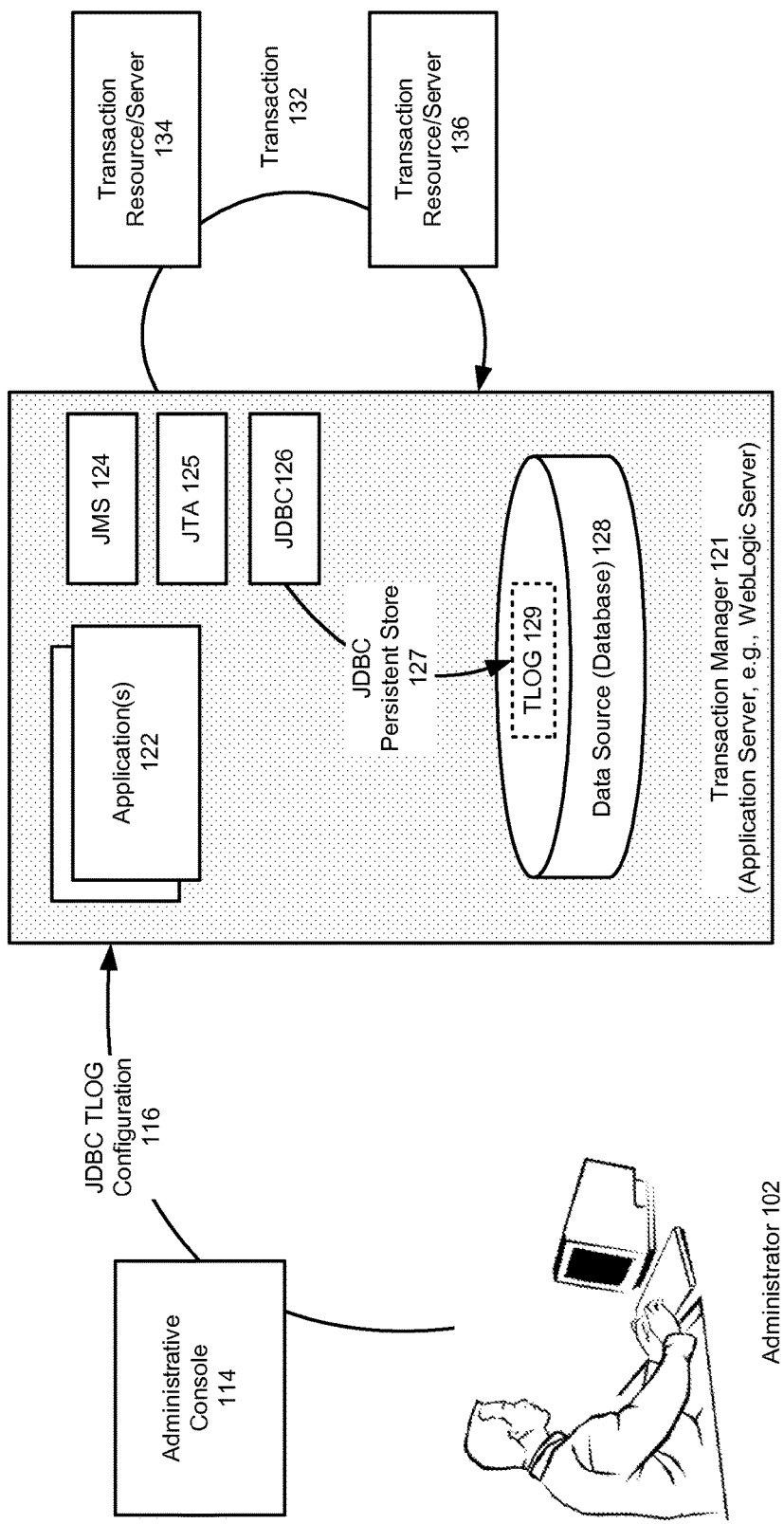
FIG. 1 illustrates a system for database persistence of transaction logs, in accordance with an embodiment.

As described above, systems for processing transactions, such as those that include a WebLogic application server, generally operate according to ACID properties, and maintain a transaction log which stores information about the transactions being coordinated by the server that may not have fully completed. To support failover, a transaction log can be stored in a location available both to the transaction manager and its backup, e.g., on a dual-ported SCSI disk, or as a distributed file system. However, such configurations can be costly and complex to administer.

In some Weblogic environments that are configured to support Logging Last Resource (LLR) transactions, LLR tables which reflect partial transaction information can be stored in a database. However, in a typical LLR environment the primary transaction log information is still generally stored in a file system, with the accompanying issues described above.

To address this, disclosed herein is a system and method for database persistence of transaction logs (TLOGs). Embodiments of the invention allow an administrator to configure their system to associate one or more Java Database Connectivity (JDBC) TLOG stores with a data source or database instead of a file system, for use in storing the primary TLOG. This provides an opportunity to exploit the high availability features of a database system; improve handling of disaster recovery scenarios, such as cross-site recovery using database replication; and alleviate the need for third-party distributed file system components, together with their cost and complexity.

Glossary

In accordance with an embodiment, the following terms are used herein. It will be evident that, in accordance with other embodiments, additional and/or different terms can be used.

JMS: Java Message Service, an application program interface (API) for use in sending messages.

JTA: Java Transaction API, an API that enables distributed transactions to be performed across multiple X/Open XA resources.

JDBC: Java Database Connectivity, an API that defines how a client can access a database.

Transaction Log (TLOG): A persistent state used by a transaction manager to persist a transaction record, which allows the transaction manager to recover transaction state in the event of a system failure.

Primary TLOG: A store which contains primary transaction information, such as resource checkpoint, server checkpoint, and transaction commit information not using an LLR participant. In accordance with an embodiment, the primary TLOG can be a JTA primary TLOG.

LLR: Logging Last Resource, an optimization wherein LLR tables which reflect partial transaction information can be stored in a database.

In accordance with an embodiment, an application server, such as a WebLogic server, includes a JDBC persistent store. Generally described, the JDBC persistent store can be used by subsystems and services that require persistence. Some examples of the types of subsystems that can use the JDBC persistent store include a Diagnostic Service Log service which uses the store to record data events and harvested metrics; a Web Services subsystem which uses it to store request and response SOAP messages; and a JMS subsystem which uses it to store persistent JMS messages or temporarily store store-and-forward messages The JDBC persistent store supports persistence either to a file-based store, or to a JDBC-enabled database. A persistent file-based store can be migrated along with its parent server as part of a whole server-level migration feature, which provides both automatic and manual migration at the server level, rather than on the service level.

In accordance with an embodiment, the JDBC persistent store is used to store transaction log (TLOG) information about committed transactions that are being coordinated by the server that may not have been completed. The TLOGs can be stored in a default persistent store or a JDBC TLOG store. An administrator can configure the JDBC TLOG store to persist transaction logs, including the primary TLOG, to a database.

In accordance with an embodiment, multiple WebLogic servers cannot share one persistent JDBC store for primary TLOG storage and so it is necessary to create/target a store for every server.

In accordance with an embodiment, the JDBC store used by JTA TLOG will be created/opened/closed internally by JTA, and will be used by JTA solely. No other sub-system will access. They are not the same administrative objects as the current "file stores" and "JDBC stores" that customers can configure under domain and will be filtered out from the console page, etc. JTA will introduce a new MBean(s) and new attribute(s) in ServerMBean to configure separately. Configure JTA Primary TLOG Store Using Mbean In accordance with an embodiment, the following method will be added to "weblogic.management.configuration-.serverMbean". A new Mbean TransactionLogJDBC-StoreMBean is used to define the TLOG JDBC store.

In accordance with an embodiment, JTA depends to a large degree on the JDBC store's ability to process these errors. It will likely be necessary to somehow wrap and/or extend the JDBC store with a custom restart/recovery mechanism as the current JDBC store will cease to function once it throws a failure up the stack. Before it shuts down the JDBC store will retry database operations internally (primarily in hopes of a RAC fail-over) before re-throwing, but will only retry within a limited time span (on the order of seconds) before giving up (see configuration section for details on retry, etc. settings).

In accordance with an embodiment, since the JTA subsystem will have a dedicated JDBC store for this purpose, JTA itself can wrap the JDBC store with something that automatically closes and re-opens the store on failure. JTA must insure that a poor JDBC store health-state doesn't somehow cause a migration to occur before the internal close/re-open retries occur.

In accordance with an embodiment, the store name is "_WLS <server name>" if using default store, or "TLOG_<server name>" if using JDBC store. A new method will be added to JTARuntimeMBean, to return a runtime MBean for the primary TLOG persistent store, regardless of it is default store or JDBC store.

Custom JDBC store users have the option of targeting the store to an MT with "restart-in-place" configured. This causes the MT and all of its associated subsystems to automatically shutdown and periodically try restarting on a JDBC failure. If JDBC store cannot recover from failure, JTA will try its best to recover from failure.

Once JTA determines the JDBC store has failed it will try to recover the JDBC store from failed state. If the JDBC store cannot recover from failure until MaxRetrySeconds-BeforeTLogFail, JTA will change JTA's health state to HEALTH_FAILED. JTA will conduct this retry every RetryIntervalSeconds.

FIG. 1 illustrates a system for database persistence of transaction logs, in accordance with an embodiment. As shown in FIG. 1, in accordance with an embodiment, an application server, e.g., a WebLogic server acting as a transaction manager 121, includes one or more applications 122, together with JMS 124, JTA 125, and JDBC 126 subsystems, and a data source or database 128 that can be configured to interface with the server's JDBC persistent store.

Examples of the types of data source that can be used include generic data sources, GridLink data sources, or multi data sources backed by a fully replicated, zero-latency database, such as Oracle Data Guard or Oracle Real Application Clusters (RAC). In accordance with an embodiment, the data source must be a non-XA data source. Each persistent JDBC store can use a database table to store information, and each server can use its own database table to store its primary TLOG information. The data source used to store the TLOG information should be available at server startup; otherwise the server instance will fail to boot.

An administrator 102 can use an administrative console 114 or another configuration means to associate 116 one or more JDBC TLOG stores with the data source configured previously. In accordance with an embodiment, only globally-scoped (i.e., not application-scoped) data sources can be targeted to a JDBC TLOG store. If high availability is required, the data source can be made available to one or more backup servers.

In accordance with an embodiment, a unique value can be optionally associated with each configured JDBC TLOG store. One JDBC TLOG store can be configured per server (e.g., per WebLogic Server); multiple servers cannot share a JDBC TLOG store.

During processing of a transaction 132 involving one or more transaction resources/servers 134, 136, the primary TLOG information 129 associated with the transaction is persistently stored 127 to the configured JDBC TLOG store at the data source. In accordance with an embodiment, only the JTA subsystem can open/use the JDBC TLOG store to persist information about committed transactions coordinated by the server that may not have been completed, i.e., no other systems can access the JDBC TLOG store.

In accordance with an embodiment, use of a JDBC TLOG store does not change LLR behavior, and a JDBC TLOG store can be used with or without LLR. When used in tandem with LLR transactions, the transaction committing information is stored in a LLR table, but the primary TLOG information including checkpoint records and heuristic logs are stored in the JDBC TLOG store.

In accordance with an embodiment, if the JDBC TLOG store becomes unavailable, its JTA health state transitions to FAILED and any global transactions will fail; the JTA transaction recovery system can then attempt to recover from transient runtime errors if possible, and resolve any in-doubt transactions. Embodiments of the system can support both manual and automatic migration of the Transaction Recovery Service when using a JDBC TLOG store; to support migration, the data source used by the JDBC TLOG store must be targeted on both the primary server instance and a backup server instance.

Figure 2:
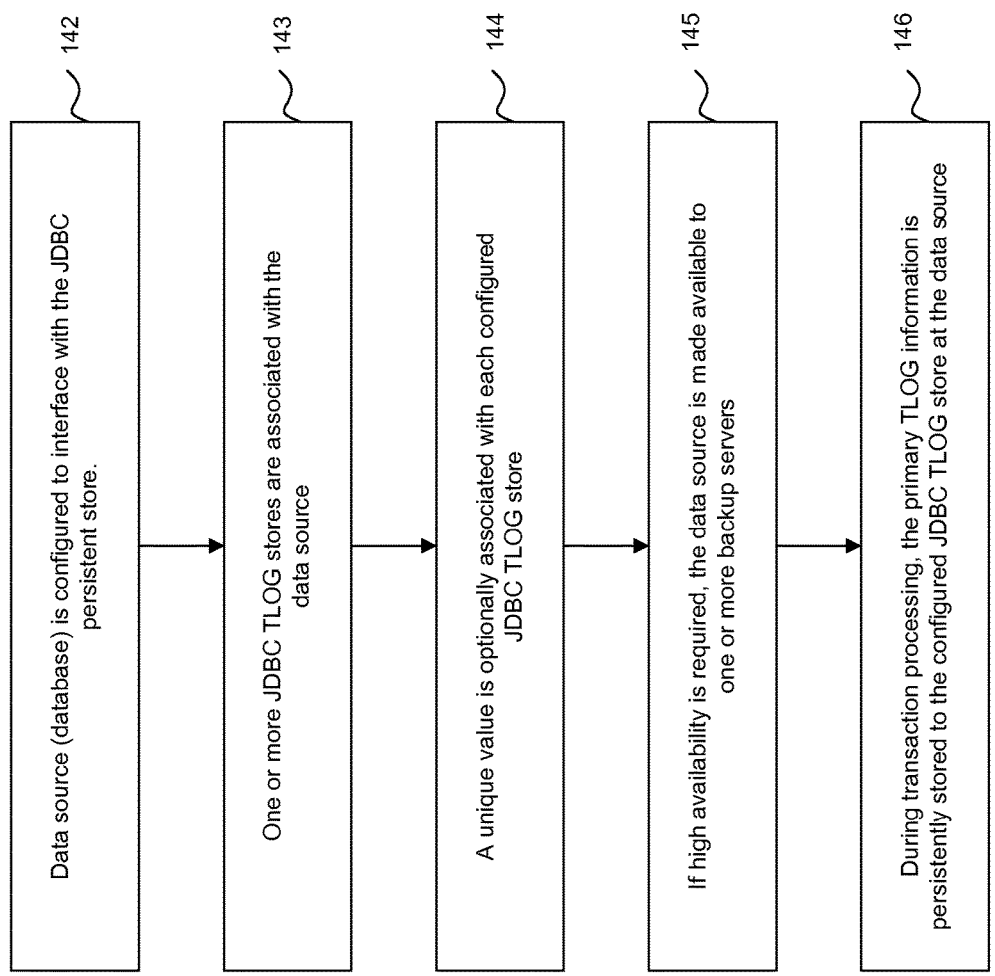
FIG. 2 shows a flowchart of method for database persistence of transaction logs, in accordance with an embodiment.

FIG. 2 shows a flowchart of method for database persistence of transaction logs, in accordance with an embodiment. As shown in FIG. 2, in accordance with an embodiment, the process of creating and using a JDBC TLOG store includes, in step 142, configuring a data source (database) to interface with the JDBC persistent store. In step 143, one or more JDBC TLOG stores are associated with the data source configured previously. In step 144, a unique value is optionally associated with each configured JDBC TLOG store. In step 145, if high availability is required, the data source is made available to one or more backup servers. In step 146, during transaction processing, the primary TLOG information associated with the transaction is persistently stored to the configured JDBC TLOG store at the data source.

Table 1 illustrates some examples of configuration options that can be uses with a JDBC TLOG store, in accordance with an embodiment. It will be evident that, in accordance with other embodiments, additional and/or different configuration options can be used.

In accordance with an embodiment, an example JDBC TLOG configuration using a JDBC data source "MyDataSource" is illustrated below. It will be evident that, in accordance with other embodiments, additional and/or different JDBC TLOG configurations can be used:

```
<server>
   <transaction-log-jdbc-store>
      <data-source>MyDataSource</data-source>
      <prefix-name>TLOG_MS1</prefix-name>
      <create-table-ddl-file>myDDL/myCreateTable.sql</create-table-ddl-file>
      <max-retry-seconds-before-tlog-fail>120</max-retry-seconds-before-tlog-fail>
   </transaction-log-jdbc-store>
</server>
```

Embodiments of the invention also provide an opportunity to exploit the high availability (HA) features of a database system; improve handling of disaster recovery scenarios, such as cross-site recovery using database replication.

Figure 3:
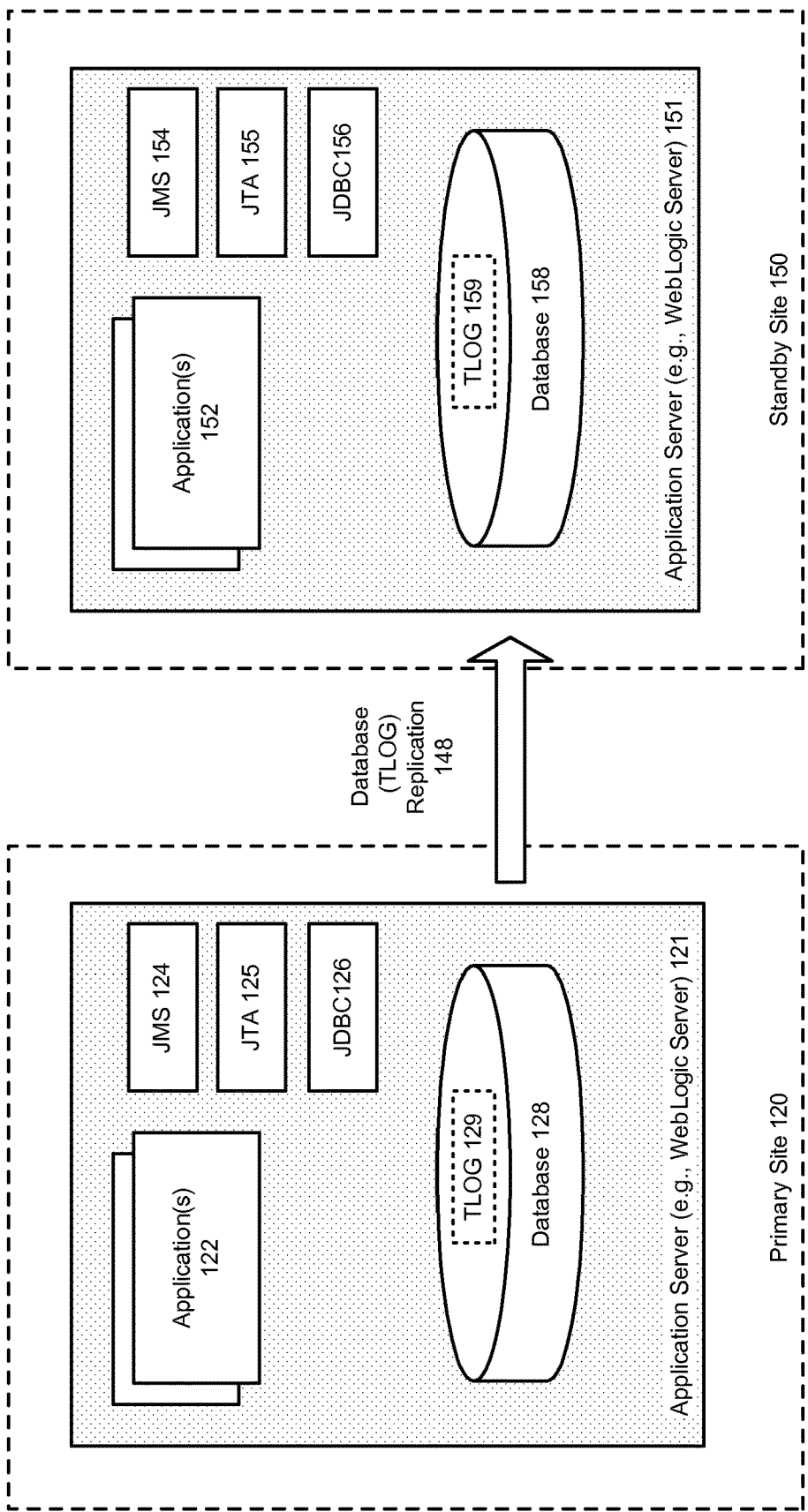
FIG. 3 illustrates a system for database persistence of transaction logs, in accordance with another embodiment.

For example, FIG. 3 illustrates a system for database persistence of transaction logs, in accordance with another embodiment. As shown in FIG. 3, in accordance with an embodiment, a primary site 120 can be configured with an application server acting as a transaction manager, as described above; while a secondary site 150 can be similarly configured with an application server 151 that includes one or more applications 152, together with JMS 154, JTA 155, and JDBC 156 subsystems, and a data source or database 158 that can be configured to store primary TLOG information 159. When a highly-available database product, such as Oracle Data Guard or Oracle RAC, is used, the system

TABLE 1

| Option | Required/Value | Description |
| --- | --- | --- |
| Data Source | Yes | JDBC data source or multi data source used by the JDBC store to access the store's database table (WLStore). In accordance with an embodiment, the data source or multi data source must be targeted to the same server instance as the JDBC store, and use a non-XA JDBC driver. |
| Prefix Name | No | A unique value for each configured JDBC store. In accordance with an embodiment, when no prefix is specified, the JDBC store table name is simply WLStore, and the database implicitly determines the schema according to the current user of the JDBC connection. |
| Create Table from DDL File | No | Optionally used with supported DDL (data definition language) files to create the JDBC store's database table (WLStore). |
| Deletes Per Batch Maximum | Default 20 | Maximum number of table rows that are deleted per database call. |
| Inserts Per Batch Maximum | Default 20 | Maximum number of table rows that are inserted per database call. |
| Deletes Per Statement Maximum | Default 20 | Maximum number of table rows that are deleted per database call. |
| MaxRetrySecondsBefore TLogFail | Default 300 | Maximum amount of time the server tries to recover from a JDBC TLOG store failure. In accordance with an embodiment, if a store remains unusable after this period, its health state is set to HEALTH_FAILED; a value of 0 immediately sets the health state as HEALTH_FAILED. |
| MaxRetrySecondsBefore TXRollback | Default 60 | Maximum amount of time the server waits before trying to recover from a JDBC TLOG store failure while processing a transaction. In accordance with an embodiment, if a store remains unusable after this amount of time, the affected transaction is rolled back; a value of 0 rolls back the transaction immediately. |
| RetryIntervalSeconds | Default 5 | Amount of time the server waits before attempting to verify the health of the TLOG store after a store failure has occurred. | can exploit the replication and other HA aspects inherent in the underlying database system. Database information at the primary site, including persisted TLOG information, can be replicated to the secondary site, for use by the secondary site in the event of a system failure at the primary site, to recover the persisted transaction.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for database persistence of transaction logs, comprising:

one or more computers, each including a microprocessor;

a primary application server instance and a backup application server instance executing on the one or more computers, wherein the primary application server instance acts as a transaction manager coordinating transactions;

a Java transaction application programming interface (JTA) subsystem that includes a transaction recovery service;

an administrative console that enables configuration of a Java database connectivity (JDBC) persistent store for storing a transaction log (TLOG) of the transactions, and enables association of the JDBC persistent store with a data source, wherein the JDBC persistent store represents an administrative object that is defined by a management bean object;

wherein the data source is configured for use by the JDBC persistent store to access a database table of the JDBC persistent store, is made available to both the primary application server instance and the backup application server instance, and provides access, via the JTA subsystem, to the TLOG stored in the JDBC persistent store;

wherein the JTA subsystem is configured to create the configured JDBC persistent store, register the JDBC persistent store with a health subsystem, and associate the JDBC persistent store with the transaction recovery service;

wherein the JTA subsystem, upon detecting one or more runtime errors on the JDBC persistent store, operates to determine that the JDBC persistent store fails to process the one or more runtime errors, wherein the failure causes the JDBC persistent store to stop functioning, invoke the transaction recovery service, which operates to close the JDBC persistent store and perform a re-opening operation the JDBC persistent store at a first configurable interval for a configurable period of time, verify, by checking with the health subsystem at a second configurable interval, whether the transaction recovery service recovers the JDBC persistent store, wherein the first configurable interval, the second configurable interval, and the configurable period of time are defined in the management bean object, determine that the transaction recovery service fails to recover the JDBC persistent store after the configurable period of time, migrate the transaction recovery service and the JDBC persistent store from the primary application server instance to the backup application server instance, and wherein, after the migration, the transaction recovery service continues to use the data source available to both the primary application server instance and the backup application server instance to access the TLOG stored in the JDBC persistent store for transaction recovery.

2. The system of claim 1, wherein the data source is one of a generic data source, GridLink data source, or multi data source backed by a fully replicated, zero-latency database.

3. The system of claim 1, wherein a unique value is associated with the configured JDBC persistent store.

4. The system of claim 1, wherein the primary application server further includes a Java Message Service (JMS).

5. The system of claim 1, wherein the TLOG includes checkpoints records and heuristic logs associated with the transaction.

6. The system of claim 1, wherein each JDBC TLOG store is configured using a configuration file that specifies that a database table used by the JDBC TLOG store is created using one or more data definition language (DDL) files.

7. The system of claim 1, wherein the JDBC persistent store is specific to the primary application server instance, wherein the backup application server instance is configured with its own JDBC persistent store.

8. The system of claim 1, further comprising a first configuration management object and a second configuration management object, wherein the first configuration management object is used to define the JDBC persistent store, and wherein the second configuration management object is used to configure the primary application server instance, and includes a method for use in retrieving the first management object used to define the JDBC persistent store.

9. The system of claim 8, further comprising a first runtime management object for the JTA subsystem, wherein the runtime management object is invoked to call the method in the second configuration object to retrieve a second runtime management object for the JDBC persistent store.

10. A method for database persistence of transaction logs, comprising:

providing a Java transaction application programming interface (JTA) subsystem that includes a transaction recovery service;

configuring, at an administrative console, a Java database connectivity (JDBC) persistent store for storing a transaction log (TLOG) of the transactions, wherein the JDBC persistent store represents an administrative object that is defined by a management bean object;

associating the JDBC persistent store with a data source, wherein the data source is configured for use by the JDBC persistent store to access a database table of the JDBC persistent store, is made available to both the primary application server instance and the backup application server instance, and provides access, via the JTA subsystem, to the TLOG stored in the JDBC persistent store;

wherein the JTA subsystem is configured to create the configured JDBC persistent store, register the JDBC persistent store with a health subsystem, and associate the JDBC persistent store with the transaction recovery service; and wherein the JTA subsystem, upon detecting one or more runtime errors on the JDBC persistent store, operates to determine that the JDBC persistent store fails to process the one or more runtime errors, wherein the failure causes the JDBC persistent store to stop functioning, invoke the transaction recovery service, which operates to close the JDBC persistent store and perform a re-opening operation the JDBC persistent store at a first configurable interval for a configurable period of time, verify, by checking with the health subsystem at a second configurable interval, whether the transaction recovery service recovers the JDBC persistent store, wherein the first configurable interval, the second configurable interval, and the configurable period of time are defined in the management bean object, determine that the transaction recovery service fails to recover the JDBC persistent store after the configurable period of time, migrate the transaction recovery service and the JDBC persistent store from the primary application server instance to the backup application server instance, and wherein, after the migration, the transaction recovery service continues to use the data source available to both the primary application server instance and the backup application server instance to access the TLOG stored in the JDBC persistent store for transaction recovery.

11. The method of claim 10, wherein the data source is one of a generic data source, GridLink data source, or multi data source backed by a fully replicated, zero-latency database.

12. The method of claim 10, wherein a unique value is associated with the configured JDBC persistent store.

13. The method of claim 10, wherein the primary application server instance further includes a Java Message Service (JMS).

14. The method of claim 10, wherein the TLOG includes checkpoints records and heuristic logs associated with the transaction.

15. The method of claim 10, wherein each JDBC TLOG store is configured using a configuration file that specifies that a database table used by the JDBC TLOG store is created using one or more data definition language (DDL) files.

16. A non-transitory computer readable storage medium, including instructions stored thereon, which when read and executed by one or more computers, cause the one or more computers to perform the steps comprising:

providing, on a computer including a microprocessor, a primary application server instance and a backup application server instance, wherein the primary application server acts as a transaction manager coordinating transactions;

providing a Java transaction application programming interface (JTA) subsystem that includes a transaction recovery service;

configuring, at an administrative console, a Java database connectivity (JDBC) persistent store for storing a transaction log (TLOG) of the transactions, wherein the JDBC persistent store represents an administrative object that is defined by a management bean object;

associating the JDBC persistent store with a data source, wherein the data source is configured for use by the JDBC persistent store to access a database table of the JDBC persistent store, is made available to both the primary application server instance and the backup application server instance, and provides access, via the JTA subsystem, to the TLOG stored in the JDBC persistent store;

wherein the JTA subsystem is configured to create the configured JDBC persistent store, register the JDBC persistent store with a health subsystem, and associate the JDBC persistent store with the transaction recovery service; and wherein the JTA subsystem, upon detecting one or more runtime errors on the JDBC persistent store, operates to determine that the JDBC persistent store fails to process the one or more runtime errors, wherein the failure causes the JDBC persistent store to stop functioning, invoke the transaction recovery service, which operates to close the JDBC persistent store and perform a re-opening operation the JDBC persistent store at a first configurable interval for a configurable period of time, verify, by checking with the health subsystem at a second configurable interval, whether the transaction recovery service recovers the JDBC persistent store, wherein the first configurable interval, the second configurable interval, and the configurable period of time are defined in the management bean object, determine that the transaction recovery service fails to recover the JDBC persistent store after the configurable period of time, migrate the transaction recovery service and the JDBC persistent store from the primary application server instance to the backup application server instance, and wherein, after the migration, the transaction recovery service continues to use the data source available to both the primary application server instance and the backup application server instance to access the TLOG stored in the JDBC persistent store for transaction recovery.

17. The non-transitory computer readable storage medium of claim 16, wherein the application server instance further includes a Java Message Service (JMS).

18. The non-transitory computer readable storage medium of claim 16, wherein the TLOG includes checkpoints records and heuristic logs associated with the transaction.

19. The non-transitory computer readable storage medium of claim 16, wherein the data source is one of a generic data source, GridLink data source, or multi data source backed by a fully replicated, zero-latency database.

20. The non-transitory computer readable storage medium of claim 18, wherein a unique value is associated with the configured JDBC persistent store.

21. The non-transitory computer readable storage medium of claim 16, wherein each JDBC TLOG store is configured using a configuration file that specifies that a database table used by the JDBC TLOG store is created using one or more data definition language (DDL) files.

* * * * *

UNITED STATES PATENT AND TRADEMARK OFFICE
CERTIFICATE OF CORRECTION

PATENT NO. : 10,127,259 B2
APPLICATION NO. : 13/632836
DATED : November 13, 2018
INVENTOR(S) : Tian et al.

Page 1 of 1

It is certified that error appears in the above-identified patent and that said Letters Patent is hereby corrected as shown below:

In the Specification

In Column 1, Line 19, delete "reporoduction" and insert -- reproduction --, therefor.

In Column 3, Line 16, delete "messages" and insert -- messages. --, therefor.

Signed and Sealed this
Twenty-ninth Day of October, 2019

Andrei Iancu
*Director of the United States Patent and Trademark Office*